3,529,063
PHARMACEUTICAL COMPOSITIONS CONTAINING OXIMES OF BENZOCYCLOBUTENE AND METHOD FOR EFFECTING SKELETAL MUSCLE RELAXATION
Joseph A. Skorcz, Milwaukee, Wis., assignor to Colgate-Palmolive Company, New York, N.Y., a corporation of Delaware
No Drawing. Continuation-in-part of application Ser. No. 388,311, Aug. 7, 1964. This application Jan. 5, 1968, Ser. No. 695,890
The portion of the term of the patent subsequent to Sept. 30, 1986, has been disclaimed
Int. Cl. A61k 27/00
U.S. Cl. 424—327                    7 Claims

ABSTRACT OF THE DISCLOSURE

The pharmaceutical compositions contain oxime derivatives of benzocyclobutene in combination with a pharmaceutical diluent. The compositions are useful in a method of effecting skeletal muscle relaxation in animals. A composition specifically disclosed contains 1-acetylbenzocyclobutene oxime in combination with a pharmaceutical diluent.

---

The present application is a continuation-in-part of my earlier copending application, Ser. No. 388,311, filed Aug. 7, 1964, now abandoned.

SUMMARY OF THE INVENTION

The invention relates to pharmaceutical compositions containing benzocyclobutene oximes of the formula

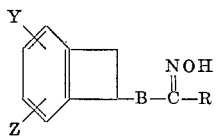

in which Y and Z are selected from hydrogen, halogen, trifluoromethyl, lower alkoxy and lower alkyl, B is a single chemical bond or a lower alkylene group of 1 to 4 carbon atoms and R is a lower alkyl of 1 to 4 carbon atoms, cyclopropyl or phenyl.

DETAILED DESCRIPTION

The novel pharmaceutical compositions of the present invention contain oximes of benzocyclobutenes of the formula

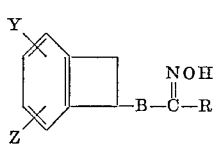

in which Y and Z are selected from the group consisting of hydrogen, halogen, such as chloro, bromo or fluoro, trifluoromethyl, lower alkoxy, such as methoxy or ethoxy and a lower alkyl of 1 to 4 carbon atoms, B is a single chemical bond or a lower alkylene group of 1 to 4 carbon atoms and R is a lower alkyl of 1 to 4 carbon atoms, cyclopropyl or phenyl.

The oximes employed in the compositions of the present invention are preferably prepared by treating the corresponding acyl or keto benzocyclobutene derivative with hydroxylamine to form the corresponding oxime. This process may be represented as follows:

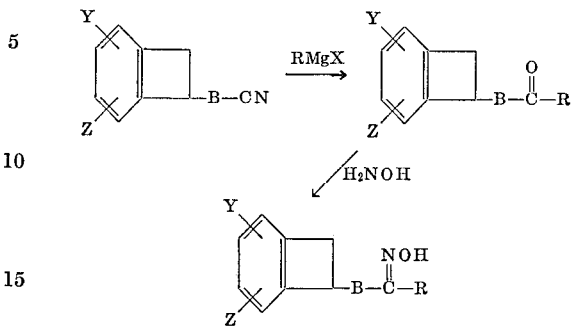

wherein Y, Z, B and R are as previously defined.

Some of the nitriles which may be used in the above described process are 1-cyanobenzocyclobutene,
1-cyanomethylbenzocyclobutene,
1-(2-cyanoethyl)-benzocyclobutene,
1-(1-cyanoethyl)-benzocyclobutene,
1-(3-cyanopropyl)-benzocyclobutene,
1-cyano-3-methylbenzocyclobutene,
1-cyano-5-methoxybenzocyclobutene, and
1-cyano-4-trifluoromethylbenzocyclobutene.

In the preferred process the nitrile is reacted with a suitable Grignard reagent to form the ketimine salt which is in turn hydrolyzed to form the corresponding acyl or keto benzocyclobutene. Among the Grignard reagents which can be employed are methylmagnesium bromide, ethylmagnesium chloride, methylmagnesium iodide, butylmagnesium bromide, phenylmagnesium iodide and cyclopropylmagnesium bromide.

The reaction is readily effected under conventional Grignard conditions and the ketimine salt is readily hydrolyzed in the presence of a weak acid to form the acyl to keto benzocyclobutene. Some of the acyl benzocyclobutenes which may be formed in this manner are 1-acetylbenzocyclobutene,
1-acetylbenzocyclobutene,
1-acetyl-3-methylbenzocyclobutene,
1-acetyl-4-trifluoromethylbenzocyclobutene,
1-acetyl-5-methoxybenzocyclobutene,
1-benzocyclobutenyl phenyl ketone,
1-benzocyclobutenyl ethyl ketone,
1-benzocyclobutenyl butyl ketone, and
1-benzocyclobutenyl cyclopropyl ketone.

The above acyl benzocyclobutenes may also be prepared as described in U.S. Pat. No. 3,149,159.

The desired oximes are readily prepared by treating the acyl benzocyclobutenes with hydroxylamine in a mutual organic solvent. The hydroxyl amine can be produced in situ by the neutralization of a hydroxyl amine salt such as the hydrochloride, preferably in the presence of an acid receptor such as an inorganic base or an organic base such as pyridine.

The reaction may be conducted in an organic solvent such as ethanol, isopropanol or tetrahydrofuran. The reaction proceeds without difficulty at reflux temperature and is substantially complete in about one to four hours. Upon completion of the reaction the reaction mixture may be chilled with ice water, extracted with ether and the desired product recrystallized from a solvent such as cyclohexane.

Representative of the oximes which may be prepared as described are the following:

1-acetylbenzocyclobutene oxime,
1-acetonylbenzocyclobutene oxime,
1-acetyl-3-methylbenzocyclobutene oxime,
1-acetyl-4-trifluoromethylbenzocyclobutene oxime,
1-acetyl-5-methoxybenzocyclobutene oxime,
1-benzocyclobutenyl phenyl ketone oxime,
1-benzocyclobutenyl butyl ketone oxime,
1-benzocyclobutenyl ethyl ketone oxime, and
1-benzocyclobutenyl cyclopropyl ketone oxime.

The pharmaceutical compositions are formed by combining the oxime with one or more suitable pharmaceutical diluents and forming the resulting mixture into unit dosage forms suitable for oral or parenteral administration. The pharmaceutical diluents which may be employed may be either liquid or solid. The preferred liquid diluent is Water for Injection U.S.P., however, if the compounds are not soluble in water a pharmaceutically acceptable organic solvent such as the propylene glycol may be used.

Among the solid pharmaceutical diluents which may be used are starch, sugar and talc, which may be used to form powders which may in turn be used to form tablets or capsules. In addition to the foregoing materials a wide variety of conventional pharmaceutical additives may be incorporated such as lubricants, disintegrating agents, flavoring agents, and the like. Unit dosage forms should advisably contain about 5 to 50 mg. of the active ingredients and may be administered at the rate of one or more daily, as prescribed.

A typical tablet may have the composition:

|   | Mg. |
|---|---|
| (1) 1-acetylbenzocyclobutene oxime | 10 |
| (2) Starch U.S.P. | 57 |
| (3) Lactose U.S.P. | 73 |
| (4) Talc U.S.P. | 9 |
| (5) Stearic acid | 6 |

Powders 1, 2 and 3 are slugged, then granulated, mixed with 4 and 5, and tableted.

Capsules may be prepared by filling No. 3 hard gelatin capsules with the following ingredients, thoroughly mixed:

|   | Mg. |
|---|---|
| (1) 1-acetylbenzocyclobutene oxime | 5 |
| (2) Lactose U.S.P. | 200 |
| (3) Starch U.S.P. | 16 |
| (4) Talc U.S.P. | 5 |

Pharmaceutical compositions containing benzocyclobutene oximes demonstrated activity as skeletal muscle relaxants in the standard "spinal cat" preparation. In this test, a "spinal cat" is prepared by cutting the spinal cord of the cat at the neck to eliminate any interference from the brain. The compositions are then administered intravenously and the monosynaptic and polysynaptic reflexes continuously stimulated and recorded. The results taken at prescribed intervals are measured and compared to the results obtained in the same animal prior to medication and the same animal after administration of chlorzoxazone, a commercially available skeletal muscle relaxant. The following representative compounds were found to possess a skeletal muscle relaxant activity at intravenous doses of 4 to 16 mg./kg.:

1-acetylbenzocyclobutene oxime,
1-benzocyclobutenyl phenyl ketone oxime,
1-benzocyclobutenyl cyclopropyl ketone oxime, and
1-benzocyclobutenyl butyl ketone oxime.

All of the above compounds were found to have an $LD_{50}$ in mice greater than 500 mg./kg. intraperitoneally when evaluated in studies patterned after those described by S. Irwin in "Animal and Clinical Pharmacologic Techniques in Drug Evaluation," J. H. Nodine and P. E. Siegler, ed., Year Book Medical Publishers, Inc., Chicago, Ill. (1964), pp. 36–54.

The following examples are presented to illustrate the invention:

Example 1.—1-acetyl-benzocyclobutene

To the Grignard reagent prepared from 5.8 g. of magnesium and 31.5 g. of methyl iodide was added with refluxing 25.8 g. of 1-cyanobenzocyclobutene in 100 ml. of ether. The mixture was heated for 5 hours and then was cooled; the complex was decomposed with saturated ammonium chloride solution. Evaporation of the dried ether solution gave a viscous liquid which was heated in 100 ml. of water at 80° C. for 1 hour. The organic phase was taken up in ether which was dried and evaporated. Distillation of the residue gave the ketone as a colorless liquid, B.P. 93–103° C. at 3.5 mm.

Example 2.—1-acetyl-benzocyclobutene oxime

To a cold solution of 2.4 g. of hydroxylamine hydrochloride and 2.8 g. of sodium acetate in 80 ml. of 50% aqueous ethanol was added dropwise 4.7 g. of the 1-acetylbenzocyclobutene in 15 ml. of ethanol. The solution was stirred in an ice bath for 2 hours, at room temperature for 12 hours and finally was refluxed for 1 hour. Solvent evaporation gave an oil which crystallized on cooling. Recrystallization from n-hexane afforded the oxime as a colorless solid, M.P. 90–91.5° C.

Analysis.—Calcd. for $C_{10}H_{11}NO$ (percent): C, 74.53; H, 6.88; N, 8.29. Found (percent): C, 74.32; H, 6.82; N, 8.57.

Example 3.—1-benzocyclobutenyl phenyl ketone

To the Grignard reagent prepared from 6.8 g. of magnesium and 47.1 g. of bromobenzene in 300 ml. of dry ether was added dropwise a solution of 1-cyanobenzocyclobutene (25.8 g.) in 50 ml. of ether. The mixture was stirred at room temperature for 18 hours, then was treated with 30 ml. of saturated ammonium chloride solution, diluted with water (750 ml.) and heated to remove all of the ether. After refluxing for 1 hour, the mixture was extracted with three 200 ml. portions of ether which were combined, dried and evaporated. Distillation of the residual oil afforded the ketone as a pale yellow, viscous liquid, B.P. 124–126° C. (0.04 mm.), which readily solidified on standing. Recrystallization of a portion from methanol-water (3:1) gave the ketone as long, white needles, M.P. 75–77.5° C.

Analysis.—Calcd. for $C_{15}H_{12}O$ (percent): C, 86.51; H, 5.81. Found (percent): C, 86.32; H, 5.90.

Example 4.—1-benzocyclobutenyl phenyl ketone oxime

To a solution of 3.8 g. of hydroxylamine hydrochloride and 4.5 g. of sodium acetate in 100 ml. of 50% aqueous ethanol was added 10.4 g. of 1-benzocyclobutenyl phenyl ketone in 70 ml. of ethanol-methanol (1:1). The mixture was heated to 40° C., and the resulting solution was kept at that temperature for 16 hours. The oil remaining after removal of the solvent was treated with water (100 ml.) and taken up in three 100 ml. portions of ether which were combined, dried and evaporated. Crystallization of the residual semi-solid from n-hexane afforded 6.4 g. of solid with a broad melting range. Elution of this material from a column of alumina with benzene-ether (1:3) gave the oxime as white needles, M.P. 105–132° C. on recrystallization from aqueous methanol.

Analysis.—Calcd. for $C_{15}H_{13}NO$ (percent): C, 80.69; H, 5.87; N, 6.27. Found (percent): C, 80.49; H, 6.17; N, 6.34.

Example 5.—1-benzocyclobutenyl butyl ketone

To the Grignard reagent prepared from 11.8 g. of magnesium and 65 g. of 1-bromobutane in 800 ml. of ether was added 1-cyanobenzocyclobutene (25 g.) in 150 ml. of ether. The ensuing reaction and workup were carried out essentially as described for the phenyl ketone in Example 3. Distillation afforded the product as a colorless liquid, B.P. 89–95° C. at 0.7 mm.

*Analysis.*—Calcd. for $C_{13}N_{16}O$ (percent): C, 82.94; H, 8.56. Found (percent): C, 82.88; H, 8.49.

Example 6.—1-benzocyclobutenyl butyl ketone oxime 1-benzocyclobutenyl butyl ketone (17 g.) in 90 ml. of ethanol was added to a cold solution of 6.8 g. of hydroxylamine hydrochloride and 8.0 g. of sodium acetate in 100 ml. of water. The solution was stirred at ice bath temperature for 2 hours, at room temperature for 15 hours, and was refluxed for 1 hour. The oil obtained by ether extraction crystallized from n-hexane. Recrystallization from cyclohexane gave the oxime as colorless flakes, M.P. 55–58° C.

*Analysis.*—Calcd. for $C_{13}H_{17}NO$ (percent): C, 76.80; H, 8.34; N, 6.89. Found (percent): C, 76.82; H, 8.22; N, 6.88.

Example 7.—1-benzocyclobutenyl cyclopropyl ketone

To the Grignard reagent prepared from 6.3 g. of magnesium and 31.5 g. of cyclopropyl bromide in 500 ml. of ether was added 22 g. of the 1-cyanobenzocyclobutene in 150 ml. of ether. Product isolation and distillation afforded the ketone, contaminated with some 1-cyanobenzocyclobutene, B.P. 87–100° C. at 4.5 mm.

Example 8.—1-benzocyclobutenyl cyclopropyl ketone oxime

A 5.7 g. sample of 1-benzocyclobutenyl cyclopropyl ketone in 30 ml. of ethanol was added to a cold solution of 2.5 g. of hydroxylamine hydrochloride and 2.9 g. of sodium acetate in 35 ml. of water and the solution was stirred overnight at room temperature. The semi-solid product was recrystallized several times from cyclohexane to give the oxime as colorless rods, M.P. 126–130° C.

*Analysis.*—Calcd. for $C_{12}H_{13}NO$ (percent): C, 76.97; H, 7.00; N, 7.48. Found (percent): C, 76.55; H, 7.09; N, 7.65.

I claim:
1. A pharmaceutical composition selected from tablets and capsules intended for administration to effect skeletal muscle relation comprising 5 to 150 mg. of a compound of the formula

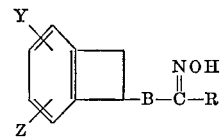

in which Y and Z are selected from the group consisting of hydrogen, halogen, trifluoromethyl, lower alkoxy and lower alkyl, B is a single chemical bond or a lower alkylene group of 1 to 4 carbon atoms and R is a lower alkyl of 1 to 4 carbon atoms, cyclopropyl or phenyl, in combination with a pharmaceutical diluent.

2. The composition of claim 1 in which the unit dosage form is a tablet intended for oral administration to effect skeletal muscle relaxation which contains 5 to 150 mg. of the active ingredient.

3. The composition of claim 1 in which the unit dosage form is a capsule intended for oral administration to effect skeletal muscle relaxation which contains 5 to 150 mg. of the active ingredient.

4. The composition of claim 1 in which the active ingredient is 1-acetylbenzocyclobutene oxime.

5. A composition of claim 1 in which Y and Z are hydrogen, R is lower alkyl and B is a single chemical bond.

6. A composition of claim 1 in which Y and Z are selected from hydrogen and halogen.

7. The method of effecting skeletal muscle relaxation in an animal which comprises administering to said animal a pharmaceutical composition of claim 1.

References Cited

UNITED STATES PATENTS

| | | | |
|---|---|---|---|
| 3,117,987 | 1/1964 | Horrom | 260—566 |
| 3,149,159 | 9/1964 | Kaiser et al. | 260—566 |
| 3,262,975 | 7/1966 | Paquette | 260—566 |

STANLEY J. FRIEDMAN, Primary Examiner